United States Patent [19]

Von Bodungen et al.

[11] 4,059,654

[45] *Nov. 22, 1977

[54] THERMOPLASTIC ELASTOMER BLEND OF EPDM, POLYETHYLENE, AND A $C_3$–$C_{16}$ POLYOLEFIN AND METHOD

[75] Inventors: George A. Von Bodungen; Curtis L. Meredith, both of Baton Rouge, La.

[73] Assignee: Copolymer Rubber & Chemical Corporation, Baton Rouge, La.

[ * ] Notice: The portion of the term of this patent subsequent to May 18, 1993, has been disclaimed.

[21] Appl. No.: 738,027

[22] Filed: Nov. 2, 1976

[51] Int. Cl.$^2$ .............................................. C08L 23/16
[52] U.S. Cl. ........................ 260/897 A; 260/33.6 AQ
[58] Field of Search .................................. 260/897 A

[56] References Cited

U.S. PATENT DOCUMENTS

| | | | |
|---|---|---|---|
| 3,256,366 | 6/1966 | Corbelli | 260/897 |
| 3,256,367 | 6/1966 | Jayne | 260/897 |
| 3,957,919 | 5/1976 | Von Bodungen et al. | 260/897 A |

*Primary Examiner*—Carman J. Seccuro
*Attorney, Agent, or Firm*—McDougall, Hersh & Scott

[57] ABSTRACT

A thermoplastic elastomer which is ideally suited for use in the fabrication of premium grade hose and other uses because of its smooth, soft and rubbery feel under widely varying temperature conditions, coupled with its exceptionally low compression set and good flexibility.

26 Claims, No Drawings

THERMOPLASTIC ELASTOMER BLEND OF EPDM, POLYETHYLENE, AND A $C_3$-$C_{16}$ POLYOLEFIN AND METHOD

This invention relates to thermoplastic elastomers having low compression set and high flexibility and to a method for the preparation of same.

In our U.S. Pat. No. 3,957,919, issued May 18, 1976, and entitled "Thermoplastic Elastomer Composition and Method for Preparation", description is made of the preparation of an improved thermoplastic elastomer by combining an EPDM interpolymer, a polymer of a monoolefin having from 3–16 carbon atoms, preferably polypropylene, and polyethylene, in which the latter is incorporated in an amount within the range of 4–15% by weight of the combined weight of the polymers, and hot working the mixture, as by molding, extruding, banburying and the like in the presence of a free radical generating catalyst, to effect a free radical reaction which results in the smooth combination of the materials into a thermoplastic elastomeric product which is substantially free of polypropylene degradation products by reason of the protection derived from the presence of the polyethylene. The polyethylene contributes further to the chracteristics of the product by reason of the smaller size of the particles, more uniform distribution of the particles and improved smoothness in the surface of the product molded thereof.

It has now been found that the described benefits derived from the presence of polyethylene can be retained and that further improvements by way of low compression set and rubbery softness, at low as well as high temperature, can be achieved whereby the resulting thermoplastic elastomeric composition becomes ideally suited for use in the manufacture of flexible hose, when use is made of a high density polyethylene in an amount greater than 15% by weight of the total EPDM-polyolefin-polyethylene, but in which the polyethylene component does not exceed 25% by weight, and preferably when the polyethylene component is present in an amount within the range of 16–20% by weight of the total polymeric component.

The polyethylene component is preferably a high density polyethylene having a specific gravity within the range of 0.941–0.965 g/cc, including linear polyethylene and copolymers of ethylene containing 10% or less copolymerized alpha-olefins having from 3–16 carbon atoms. High density polyethylenes suitable for use in the practice of this invention are well known and readily available in the market. They can be prepared by well known high pressure or low pressure polymerization processes.

The polypropylene, the preferred polyolefin polymer, may be a highly crystalline isotactic or syndyotactic polypropylene. Also, the polypropylene may be a copolymer or a block copolymer containing minor amounts of alpha-olefin comonomer of 2 and 4–16 carbon atoms. Frequently, the density of polypropylene is from 0.800–0.980 g/cc. Isotactic polypropylene, having a density within the range of 0.900–0.910 g/cc is preferred.

The EPDM interpolymers and their method of manufacture are now well known to the skilled in the art. They are, in general, prepared by the interpolymerization of a monomeric mixture containing 10-90 (preferably 55-95) mole percent ethylene and 90-10 (preferably 5-45) mole percent of at least one other straight chained monoolefin containing 3-16 carbon atoms (preferably propylene) and a polyene hydrocarbon in solution in an organic polymerization solvent, and in the presence of a Ziegler type catalyst. The preparation of such EPDM terpolymers is disclosed in U.S. Pat. Nos. 2,933,480, 3,093,620, 3,211,709, 3,113,115, and 3,300,450.

Examples of polyenes include non-bridged ring monomers such as 1,4-hexadiene, but it is preferred to make use of polyunsaturated derivatives of bicyclo-(2,2,1)-heptane bridged rings, such as dicyclopentadiene, bicyclo(2,2,1)hepta-2,5-diene, the alkylidene norbornenes, and especially the 5-alkylidene-2-norbornenes wherein the alkylidene group contains 1 to 20 carbon atoms and preferably 1 to 8 carbon atoms, the alkenyl norbornenes, and especially the 5-alkenyl-2-norbornenes wherein the alkenyl group contains about 3–20 carbon atoms and preferably 3–10 carbon atoms. Other bridged ring hydrocarbons include polyunsaturated derivatives of bicyclo-(2,2,2)-octane as represented by bicyclo(2,2,2)octa-2,5-diene, polyunsaturated derivatives of bicyclo(3,2,1)-octane, polyunsaturated derivatives of bicyclo-(3,3,1)-nonane, and polyunsaturated derivatives of bicyclo-(3,2,2)-nonane. At least one double bond is present in a bridged ring of the above compounds, and at least one other double bond is present in a bridged ring or in a side chain. Specific examples of bridged ring compounds include 5-methylene-2-norbornene, 5-ethylidene-2-norbornene, 5-isopropylidene-2-norbornene, dicyclopentadiene, the methyl butenyl norbornenes such as 5-(2-methyl-2-butenyl)-2-norbornene, or 5-(3-methyl-2-butenyl)-2-norbornene and 5-(3,5-dimethyl-4-hexenyl)-2-norbornene.

For description of the preparation of an EPDM interpolymer having a molecular ratio of ethylene to propylene in the range of 84:16 and an amount of 5-ethylidene-2-norbornene to provide an unsaturation level of about 5 carbon to carbon double bonds per 1000 carbon atoms, reference can be made to Example VI of U.S. Pat. No. 3,894,999. For description of the preparation of an EPDM having an ethylene to propylene mole ratio of 90:10, with an unsaturation level of 2 carbon to carbon double bonds per 1000 carbon atoms, derived from the polyene monomer 5-ethylidene-2-norbornene, reference can be made to Example VII of the aforementioned patent. For the preparation of an EPDM rubber in which the ethylene to propylene ratio is 60:40 and the bound 5-ethylidene-2-norbornene is in an amount to provide 14 carbon to carbon double bonds per 1000 carbon atoms, reference can be made to Example I of the aforementioned patent.

The thermoplastic elastomers of this invention are prepared in a one step process in which the EPDM polymer, polyethylene and polypropylene or other polyolefin are subjected to working along with a free radical generating agent, as represented by a peroxide such as dicumyl peroxide. The working step to effect cross-linking between the various polymers and interpolymers can be carried out as a part of the molding operation, such as during extrusion, injection molding, compression molding or the like, or it can be carried out as a separate working step, as in a Brabender, hot rolls, banbury or other hot masticating device. The free radical reaction, as by hot working, can be carried out as a batch operation by feeding the materials into a Brabender or banbury or injection molding device, or as a continuous or semi-continuous operation by continuously feeding the materials in the desired ratios onto hot working rolls or into a continuous extrusion machine.

As the free radical generating agent, any conventional curvature may be employed, including such free radical generating agents or cross-linking agents as the peroxides, whether aromatic or aliphatic as in the aromatic diacyl peroxides and aliphatic diacyl peroxides, dibasic acid peroxides, ketone peroxides, alkyl peroxyesters, alkyl hydroperoxides, e.g. diacetylperoxide, dibenzoylperoxide, bis-2,4-dichlorobenzoylperoxide, di-tert-butyl peroxide, dicumylperoxide, tert-butylperbenzoate, tert-butylcumylperoxide, 2,5-bis(tert-butyl-peroxy)-2-5-dimethyl-hexane(Varox) 2,5-bis-(tert-butyl-peroxy)-2,5-dimethylhexane-3,4,4,4',4'-tetra-(tert-butyl-peroxy)-2,2-dicyclohexylpropane, 4-bis-(tert-butyl-peroxyisopropyl)-benzene, 1,1-bis-(tert-butylperoxy)-3,3,5-trimethylcyclohexane, lauryl peroxide, succinic acid peroxide, cyclohexanone peroxide, tert-butyl peracetate, butyl hydroperoxide, etc. Also suitable are the azide types of curing agents including such materials as the azidoformates (e.g., tetramethylenebis(azidoformate); for others see U.S. Pat. No. 3,284,421, Breslow, Nov. 8, 1965), aromatic polyamides (e.g. 4,4'-diphenylmethan diazide; for others see U.S. Pat. No. 3,297,674, Breslow et al., Jan. 10, 1967), and sulfonazides such as p,p'-oxybis(benzene sulfonyl azide), etc. Also, cocuring agents such as trimethylol propane, trimethacrylate, triallylphosphate and divinyl benzene can be used to advantage.

The desired amount of free radical reaction is obtained when use is made of a peroxide, such as dicumyl peroxide, in an amount within the range of 0.25% to 4% by weight of the EPDM, and preferably in an amount within the range of 0.6% to 2.0% by weight, with others of the catalysts being used in corresponding amounts, when calculated on the molecular basis. The reaction time and temperature is calculated to be at least three times the half-life of the catalyst employed and preferably five to six times the half-life, except that the minimum reaction temperature is that at which the polyethylene or the polyolefin is reduced to a molten state. In general, it is desirable to make use of a reaction temperature for cross-linking within the range of 325°-425° F. When, for example, dicumylperoxide has a half-life of five minutes at 300° F, this means that 50% of the peroxide will decompose in five minutes at such temperature. When the reaction is continued for five to six times the half-life, it is calculated that about 97% of the peroxide will have been consumed. Under these conditions, free radical generating agent is no longer available in amount sufficient to continue the reaction so that the resulting thermoplastic elastomer is not subject to further reaction and thus remains stable during subsequent molding or re-molding without further cure.

Thus the free radical generating agent is substantially completely exhausted so that there is little or no tendency for further advancement of reaction subsequently to take place. It is sometimes desirable to insure termination of the action of any remaining free redical generating agent, by adding to the mix at this stage, a small amount of a free radical scavenging agent, such as a stabilizer or anti-oxidant. Any conventional anti-oxidant or stabilizer can be used, such as amine types, phenolic types, sulphide, phenol alkanes, phosphites and the like.

In many plastic and elastomer molding or forming operations, a considerable amount of scrap is produced. Scrap produced from the thermoplastic elastomers of this invention can be chopped and re-used one or more times with little significant deterioration in appearance, processing characteristics, or others of its physical and mechanical properties. The articles which may be produced with the thermoplastic elastomers of this invention are quite numerous, but the low temperature flexibility, low compression set and smoothness which characterizes the thermoplastic elastomers of this invention has led to wide use thereof in the manufacture of hose, preferably with fiber reinforcement in the form of braided or woven tubing.

Having described the basic concepts of this invention, illustration will now be made by way of the following examples, which are given by way of illustration and not by way of limitation:

EXAMPLES 1-5

In the following examples, the EPDM interpolymer, polyethylene and polypropylene were reduced to small segments, such as crumb, and introduced into the prescribed amounts with the peroxide or other catalyst, in powder form, into a Brabender batch mixer or an extruder operated at a temperature of 375° F for working five to six times the half-life of the peroxide. The resulting material was cooled and then extruded into test rods and injection molded into test devices for conventional comparative tests such as flexural modulus, tensile strength, percent elongation, melt flow index, spiral flow, compression set, and hardness. The ingredients and their amounts are identified for each example in the following tabulation along with the results on the test pieces formed thereof.

TABLE I

|  | Ex. 1 | Ex. 2 | Ex. 3 | Ex. 4 | Ex. 5 |
| --- | --- | --- | --- | --- | --- |
| EPDM | 70 | 70 | 70 | 70 | 70 |
| Polyethylene (% of polymer) | 10 | 15 | 20 | 25 | 30 |
| Polypropylene (% of polymer) | 20 | 15 | 10 | 5 | 0 |
| Extender oil (Sunpar) | 30 | 30 | 30 | 30 | 30 |
| Varox (catalyst) | .6 | .6 | .6 | .6 | .6 |
| Compression Set (%) |  |  |  |  |  |
| 22 hrs. at 158° F | 42.5 | 33.3 | 30.8 | 31.4 | 30.8 |
| 22 hrs. at 212° F | 49.1 | 39.1 | 38.7 | 30.1 | 46.2 |
| 22 hrs. at 250° F | 50.5 | 43.4 | 41.3 | 44.2 | 66.4 |
| Condition N |  |  |  |  |  |
| Melt Flow (gm/10 min.) | 1.6 | 1.5 | 1.8 | 0.7 | 0.6 |
| Spiral Flow (gms.) | 7.1 | 6.9 | 7.0 | 6.6 | 4.9 |
| Tensile (psi) | 650 | 600 | 675 | 675 | 750 |
| Elongation (%) | 200 | 210 | 200 | 180 | 120 |
| Flexural Modulus (psi) | 4300 | 3575 | 2650 | 2150 | 2000 |
| Die C Tear (pli) | 175 | 180 | 185 | 195 | 175 |

EXAMPLES 6-13

In the above examples, Example 2 was repeated but with the amount of peroxide catalyst varied in the range of 0-2 parts by weight per 100 parts by weight of polymer. The results are tabulated in the following table:

TABLE II

|  | Varox (phr) | Compression set at 70 hours at 158° F % | Tensile (psi) | Elongation (%) | Melt Flow (g./10 min.) (10,000 gms./ 230° C) |
| --- | --- | --- | --- | --- | --- |
| Ex. 6 | 0.0 | 57.1 | 525 | 320 | 14.0 |
| Ex. 7 | 0.40 | 42.7 | 600 | 360 | 12.0 |
| Ex. 8 | 0.60 | 39.8 | 675 | 240 | 5.5 |
| Ex. 9 | 1.0 | 40.9 | 625 | 260 | 3.6 |
| Ex. 10 | 1.25 | 36.7 | 550 | 240 | 5.2 |
| Ex. 11 | 1.50 | 35.5 | 550 | 210 | 2.7 |
| Ex. 12 | 1.75 | 35.9 | 575 | 150 | 1.5 |
| Ex. 13 | 2.0 | 34.9 | 550 | 210 | 0.6 |

The EPDM is EPsyn 4506, marketed by Copolymer Rubber & Chemical Corporation of Baton Rouge, Louisiana, and is an interpolymer of ethylene-propylene and 5-ethylidene-2-norbornene in which ethylene is present in the mole ratio of 70% and the polyene is present in an amount to provide 4.5 carbon to carbon double bonds per 1000 carbon atoms in the interpolymer.

The polyethylene is a high density polyethylene, marketed by Dow Chemical Company under the trade name 50365 or Type A, having a melt flow index ~5 and a specific gravity of 0.965.

The polypropylene is an isotactic polypropylene from Amoco Oil Company, marketed under the designation 4018 or type D, having a melt flow index of ~10 and a specific gravity of 0.91.

As shown in Table I, improvement in compression set is experienced when the amount of polyethylene copolymer exceeds 15% by weight of the polymeric material. When the amount of polyethylene is greater than 25% by weight of the total polymer, processability by extrusion to form endless hose is curtailed. Improved compression set without loss of processability is achieved in the preferred range of 15-25% by weight polyethylene although some undesirable effect on melt flow is experienced when the amount of polyethylene exceeds 20% by weight. When the amount of polyethylene is as high as 30% by weight of the polymeric composition, the desired improvement in compression set is not retained at elevated temperature.

The data set forth in Table II clearly indicates that lowest possible compression set is obtainable by complete cure. However, the amount of improvement in compression set, even with small amounts of free radical generating agents, was wholly unexpected as was the absence of improvement in compression set in relation to increase in amount of free radical generating agent beyond 1.25 parts per 100 parts of polymer (phr).

While it is preferred to make use of high density polyethylene, polyethylene of medium density (1.925-0.940 g/cc) or low density (0.910-0.925 g/cc) can be used.

The increased amount of polyethylene appears to contribute materially to the softness and smoothness of the product as well as to the lower flexural modulus which is reflected in low temperature flexibility to provide a softer and better feeling hose as compared to the stiffness characteristic of plastic hose or hose with lesser amounts of polyethylene, when evaluated at low temperature.

The precise reason for the unexpected beneficial improvement has not been established. One explanation is in the formation of a grafted specie between the EPDM interpolymer and polyethylene. Despite the fact that a grafted specie has not been isolated and identified, considerable evidence of its formation has been accumulated. Solubility and optical characteristics of Brabender blends, made in accordance with the practice of this invention, were consistent with anticipated properties of grafted species. In addition, these same properties were inconsistent with those observed for a simple blend of the three polymeric components. Hot xylene extraction of a series of samples, made in accordance with the practice of this invention, did not isolate all of the EPDM interpolymer known to be charged in the sample.

The thermoplastic elastomers of this invention are sufficiently soft to enable foaming of the material in the production of cellular structures over which a smooth and continuous film forms automatically on the surface to provide an extremely useful and unique product for use in applications in which low density is desirable, having a soft porous interior of low density enclosed within a relatively impervious flexible shell.

It will be understood that changes may be made in the details of formulation and operation without departing from the spirit of the invention, especially as defined in the following claims.

We claim:

1. A thermoplastic elastomer formed of (1) an EPDM interpolymer of ethylene, a monoolefin containing from 3-16 carbon atoms, and a polyene, (2) a polymer of a monoolefin monomer containing 3-16 carbon atoms, and (3) polyethylene in which the polyethylene is present in an amount greater than 15% but not more than 25% by weight, with the remainder of 70% to less than 85% by weight divided between the EPDM interpolymer and the monoolefin polymer in the ratio of 90-10 parts by weight of EPDM polymers to 10-90 parts by weight of monoolefin polymers, said components in admixture being subjected to free radical reaction during hot working in the presence of a free radical generating catalyst.

2. A thermoplastic elastomer as claimed in claim 1 in which the EPDM interpolymer is formed of monoolefins present in the ratio of 10-90 mole percent by weight ethylene to 90-10 mole percent by weight of a monoolefin containing 3-16 carbon atoms and in which the polyene is present in an amount to provide at least two carbon to carbon double bonds per 1000 carbon atoms.

3. A thermoplastic elastomer as claimed in claim 1 in which the monoolefin in the EPDM interpolymer is propylene, 4. A thermoplastic elastomer as claimed in claim 1 in which the monoolefin polymer is polypropylene.

5. A thermoplastic elastomer as claimed in claim 4 in which the polypropylene is an isotactic polypropylene.

6. A thermoplastic elastomer as claimed in claim 1 in which the monoolefin polymer is a copolymer of ethylene and propylene in which the bound ethylene is less than 10% by weight.

7. A thermoplastic elastomer as claimed in claim 1 in which the polyethylene is a high density polyethylene.

8. A thermoplastic elastomer as claimed in claim 1 in which the polyene is a polyunsaturated bridged ring hydrocarbon having at least one double bond in the bridged ring.

9. A thermoplastic elastomer as claimed in claim 8 in which the polyene is 5-alkylidene-2-norbornene.

10. A thermoplastic elastomer as claimed in claim 8 in which the polyene is 5-ethylidene-2-norbornene.

11. A thermoplastic elastomer as claimed in claim 1 in which the free radical generating catalyst is a peroxide.

12. A thermoplastic elastomer as claimed in claim 1 in which the free radical generating catalyst is present in an amount within the range of 0.25% to 4.0% by weight.

13. A thermoplastic elastomer as claimed in claim 1 in which the free radical generating catalyst is present in an amount within the range of 0.6% to 2.0% by weight.

14. A method for preparing a thermoplastic elastomer comprising admixing an EPDM interpolymer, a polymer of a monoolefin having from 3-16 carbon atoms and polyethylene, in which the polyethylene is present in an amount greater than 15% but not in excess of 25% by weight of the polymer total, and hot working the mixture in the presence of a free radical generating catalyst to effect free radical reaction during the hot mixing step.

15. The method as claimed in claim 14 in which the materials are hot worked together at a temperature and time corresponding to at least three times the half-life of the catalyst.

16. The method as claimed in claim 14 in which the materials are hot worked together at a temperature and time corresponding to five to six times the half-life of the catalyst.

17. The method as claimed in claim 14 in which the polymer of a monoolefin having from 3-16 carbon atoms is polypropylene.

18. The method as claimed in claim 14 in which the polymer of a monoolefin having from 3-16 carbon atoms is a copolymer of ethylene and propylene containing less than 10% by weight bound ethylene.

19. The method as claimed in claim 14 in which the free radical generating catalyst is a peroxide catalyst.

20. The method as claimed in claim 14 in which the catalyst is present in an amount within the range of 0.25% to 4.0% by weight.

21. The method as claimed in claim 14 in which the catalyst is present in an amount within the range of 0.6% to 2.0% by weight.

22. The method as claimed in claim 14 in which the EPDM is an interpolymer of ethylene, a monoolefin containing 3-16 carbon atoms, and a polyene in which the ethylene and monoolefin are present in the ratio of 10-90 mole percent ethylene to 90-10 mole percent monoolefin and in which the polyene is present in the amount to provide at least two carbon to carbon double bonds per 1000 carbon atoms.

23. The method as claimed in claim 22 in which the polyene is present in the interpolymer in an amount to provide from 2 to 25 carbon to carbon double bonds per 1000 carbon atoms.

24. The method as claimed in claim 22 in which the polyene present in the EPDM interpolymer is a polyunsaturated bridged ring hydrocarbon having at least one double bond in the bridged ring.

25. The method as claimed in claim 24 in which the polyene is 5-ethylidene-2-norbornene.

26. The method as claimed in claim 14 which includes the admixture of an extender oil in an amount within the range of 0 to 100 parts by weight per 100 parts by weight of the polymeric material.

* * * * *